United States Patent [19]
Luders et al.

[11] 3,800,925
[45] Apr. 2, 1974

[54] OVERRUNNING ROLLER BEARING COUPLING FOR ENGINE STARTER

[75] Inventors: Rudeger Luders, Stuttgart; Richard Negele, Esslingen-Rudern; Walter Ruhle, Korntal, all of Germany

[73] Assignee: Robert Bosch GmbH, Stuttgart, Germany

[22] Filed: Oct. 10, 1972

[21] Appl. No.: 295,812

[30] Foreign Application Priority Data
Nov. 25, 1971 Germany.......................... 2158380

[52] U.S. Cl. .............................................. 192/45
[51] Int. Cl. ........................................... F16d 41/06
[58] Field of Search ............................... 192/42, 45

[56] References Cited
UNITED STATES PATENTS

| | | | |
|---|---|---|---|
| 609,973 | 8/1898 | Neeley................................. | 192/45 |
| 3,087,591 | 4/1963 | Whitney et al. ..................... | 192/45 |
| 3,187,863 | 6/1965 | Giometti.............................. | 192/45 |
| 3,221,850 | 12/1965 | Bacon................................. | 192/45 |
| 3,460,655 | 8/1969 | Bowcott.............................. | 192/45 |
| 3,691,854 | 9/1972 | Barthruff et al. ..................... | 192/45 |
| 3,247,727 | 4/1966 | Digby et al. ....................... | 192/45 X |

*Primary Examiner*—Allan D. Herrmann
*Attorney, Agent, or Firm*—Flynn & Frishauf

[57] ABSTRACT

The flange joining the drive sleeve of a starter coupling with the outer race of a one-way roller bearing, instead of having a flat surface on the bearing side, is provided with raised portions shaped to position the helical springs so that they may be centered lengthwise of the rollers where they engage the latter. The seating benches thus formed are located between the wedging surfaces of the outer race and the support lugs for the springs, and they are shaped to facilitate production of sleeve, flange and outer race together with lugs and seating benches in one piece by deep drawing methods.

15 Claims, 4 Drawing Figures

OVERRUNNING ROLLER BEARING COUPLING FOR ENGINE STARTER

This invention relates to roller bearings and particularly roller bearings for the starter engagement mechanism of a motor vehicle. In such roller bearings, the outer race is usually connected by a plane flange with a sleeve adapted to be driven by the starter. Race, flange and sleeve may be made in one piece and the inner race carries a number of lugs extending radially inward for the support of helical springs engaging the rollers of the bearing.

Heretofore the surface of the flange facing the race has been made flat and guides in the form of supplementary parts have been provided to position the coil springs in the axial direction of the race and of the rollers. These supplementary parts are set in the annular space between the two races and are held in position without play by an annular cover disc fastened to the open end of the outer race. This arrangement is disadvantageous in requiring supplementary parts and related forming and assembly operations in order to assure efficient centering and guiding of the helical springs.

It is also known to provide helical springs having a rectangular winding cross-section of a length approximating the length of the rollers, so that it corresponds to the depth of the annular space between the cylindrical race surfaces. Such springs, of course, require no supplementary parts for their positioning in the axial direction of the device, but they have the disadvantage, however, that they are more expensive than springs of round coil form and, furthermore, that they can cause jamming of the roller with the turn of the coil that engages the roller.

The object of this invention is to make a roller bearing of the class described in which coil springs for the rollers can be positioned and guided as simply as possible and the guides are so made that a jamming of the rollers with the springs cannot take place.

SUBJECT MATTER OF THE PRESENT INVENTION

Briefly, the surface of the flange facing the outer race is provided with guide means in the form of raised portions, or the like, for positioning the helical springs. In a particularly advantageous form of the invention, these raised portions stand out axially on the surface of the flange facing the outer race in the form of seating benches for the springs that in one circumferential direction lead into the support lugs, while in the radial direction they join the inner containing wall of the outer race. The axial height of the seating benches is made such that when helical springs with round coils are used, the center of engagement of the springs is at least approximately in the middle of the length of the rollers.

In that manner, it is possible to use helical springs with a round coil cross-section without having to provide additional parts as guides for the springs. The outer race, flange, sleeve and guide means for the coils can all advantageously be produced in one piece by cold extrusion, that is, by high pressure cold forming in which the metal is caused to flow plastically into the desired shape. It is also feasible to manufacture these parts in other ways, for example by casting or injection molding.

In the course of cold extrusion experiments it was observed that the contours it was necessary to provide on the working surface of the stamping tool used in the extrusion operation to form the seating benches for the springs could be spared a certain amount of wear, so that the durability of the tool could be improved to some extent by avoiding a design in which the longitudinal notches provided on the outer surface of the stamping tool for the formation of the support lug would have a configuration in which these notches would have an orifice corresponding to the cross-section of the support lugs and to provide rather that the orifices of these notches should have the combined cross-section of the support lug and of an adjacent seating bench that projects in the axial direction of the part to be drawn. In this manner the strain on the notches of the drawing tool is advantageously reduced.

With respect to the extrusion operation it has been found, in accordance with this invention, particularly helpful to make the base area of the bench masses projecting in the axial direction of the one piece extruded part greater than the cross-sectional area of the adjacent support lug.

By the arrangement of the seating benches on a face of the flange, it is possible to reduce the cross-sectional area of the support lugs compared to the former designs, without shortening the life of the extrusion tool to an unacceptable extent. This has the advantage that for the same outer diameter of the bearing, the number of rollers can be increased and that for the same aggregate surface contact of the rollers, the height of the race and the length of the rollers can be reduced. This has the further effect that in totality the stresses produced by drawing are smaller and that the forces exerted by the torque to be transmitted by the device are more evenly applied to the rollers.

The open face of the seating bench facing away from the flange can appropriately be provided with a centering surface for the helical spring and likewise may be rounded off to correspond with the coil cross-section of the spring. It is desirable for this centering surface to be shorter in the circumferential direction of the device than the seating bench itself, in order to lengthen the life of the drawing tool. Hence the design can appropriately be so fashioned that the centering surface ends a short distance before the place where the seating bench joins into the support lug.

The open end of the race lends itself readily to final machining if, following a further feature of the invention, the support lugs are shorter in the axial direction than the width of the race and if, accordingly, their free ends join into the inner circumferential surface of the race a little bit back of the axial extremity of the race.

A particularly good positioning and guiding of the helical springs is produced according to the invention, if the annular cover disc closing the otherwise open end of the bearing is provided with projections located axially opposite the seating benches and thus hold the springs to the seating benches. The projections of the cover disc can conveniently be made to fit the inner profile of the outer race, so that they fix the position of the cover disc with respect to the outer race.

An illustrative example of a drive for an engagement device according to the invention for a screw advance engine starter is described in further detail with reference to the drawings in which.

The engagement drive of an engine starter is essentially an overrunning coupling. That is, it must transmit rotation in one direction, as when the starter is turning the engine over, but it must permit one side to turn freely with respect to the other in the other direction as when the engine has started and the starter is no longer energized and not yet disengaged.

Figure 1:
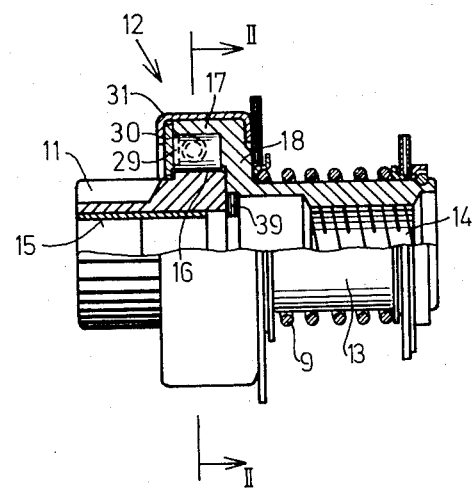
FIG. 1 is a longitudinal view, chiefly in section, of an engagement drive.
Figure 2:
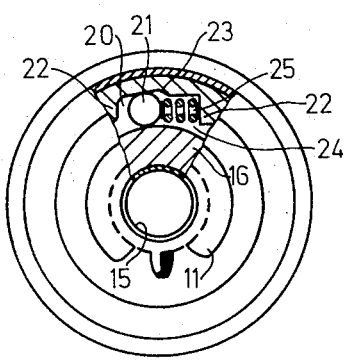
FIG. 2 is an end view of the drive shown in FIG. 1, partly in a section on the line II—II of FIG. 1.

As shown in FIG. 1 the drive has a pinion 11 that is connected by an overrunning bearing coupling 12 with a sleeve 13. The sleeve 13 has an inside coarse thread 14 that meshes with a corresponding thread of a starter motor shaft (not shown). The pinion 11 has a bore 15 on which it is mounted on a smooth section of the motor shaft (not shown) in a manner allowing it to turn or to slide longitudinally with respect to the shaft.

Figure 3:
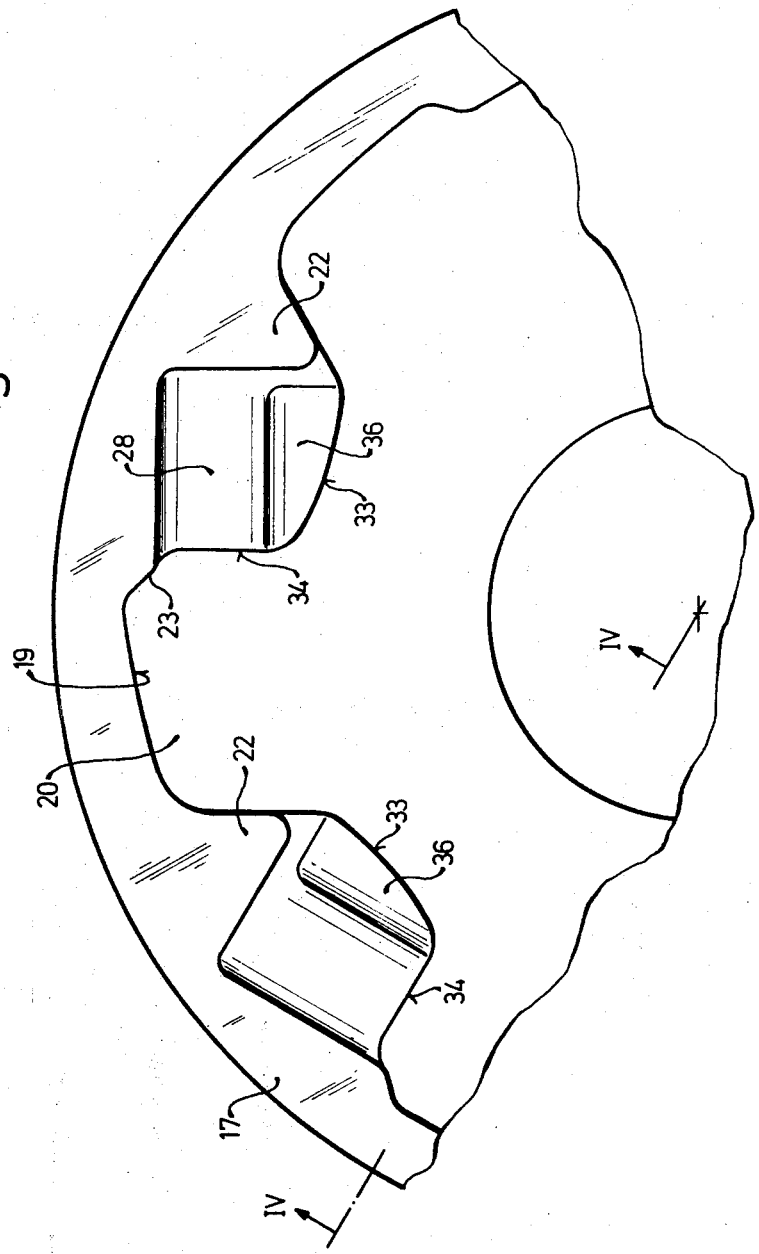
FIG. 3 is an enlarged representation in end view of a portion of one component of the drive shown in FIG. 1.

The overrunning coupling 12 has an inner roller race ring 16 formed or made integral with pinion 11 and an outer race ring 17, formed or made integral with the sleeve 13 by means of a connecting flange 18. Six wedging surfaces 19 are provided on the outer race 17 evenly spaced about the circumference (FIG. 3), which together with the inner race 16 form six wedge shaped tapering cavities 20 in each of which a roller 21 is located. The cavities 20 are bounded in the circumferential direction by projecting stops 22 formed on the outer race 17 and extending radially inward on the one hand and on the other hand by narrow radial shoulders 23 where the cavities 20 join spaces 24 designed to accept the helical springs 25. The springs 25 have a circular helical cross-section. One end of each spring is supported on one of the stops 22, while the other presses one of the rollers 21 along the wedging surface 19 so that upon rotation of the outer race 17 in one direction, a rigid rotational coupling drives the pinion 11.

The outer race 17 is integrally connected with flange 18 and sleeve 13. The unit composed of these three parts is formed in one piece by a cold extrusion process. In order to provide guiding for the cylindrical coil springs 25 the face of the flange 18 which faces the race 17 is provided with axially projecting seating benches 28, which in one circumferential direction join the lugs 22 and in the radial direction join into the inner circumferential wall of the race 17. The axial height of the seating benches 28 is so designed that the engagement of the helical springs 25 with the rollers 21 is centered at the middle of the length of the rollers.

On the other side the helical springs are guided by projections 29 of a cover disc 30 which closes off the inner space of the coupling from the exterior of the device. The cover disc 30 is held fast by a ring 31 which is drawn over the race ring 17 and has a lip extending over the edge of the disc 30. The projections 29 of the cover disc 30 fit the inner circumference profile of the race 17 in the neighborhood of its shoulders 23 and prevent the cover disc 30 from rotating with respect to the race 17.

The base area of the bench mass 28 that projects from the flange 18 in the axial direction of the extruded metal piece is greater than the cross-sectional area of the adjoining stop 22. The inner boundary 33 of the seating bench 28 is slightly curved and convex towards the axis of the drawn metal unit and continues without interruption into the sidewall of the stop 22. On the side away from the stop 22, the side edge 34 of the seating bench 28 meets the race 17 at the location of the shoulder 23 formed in the race between the wedging surface 19 and the adjacent wall surface of the race.

The open face of the seating bench 28 on its surface raised away from flange 18 is rounded off in a manner, corresponding to the coil cross-section of the helical spring 25 and is thereby provided with a centering surface 36 concave towards the axis of the extruded metal piece. The centering surface 36 is shorter in the circumferential direction of the drawn metal piece than the seating bench and is so designed that it ends a little bit short of the junction or transition between the seating bench and the stud 22. In this manner the result is obtained that the necessary raised portion of the extruding tool for shaping the hollow in the clear face of the seating bench 28 is connected by a fillet with the material that reaches just to the plane of the face of the bench, as the result of which the life of the tool is increased.

Figure 4:
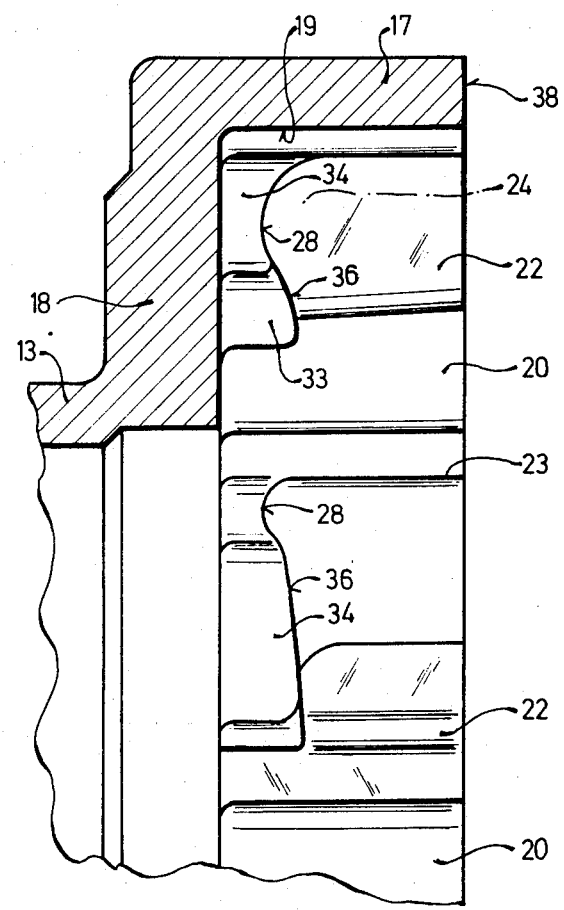
FIG. 4 is a section along the line IV—IV of FIG. 3.

The stops 22 are shorter in the axial direction of the extruded metal piece than the width of the inner surface of the race 17, so that the end surface 38 (FIG. 4) of the race 17 can be given final machining to remove burrs and any other irregularities without interference by the stops. At the coupling end of the hub bore of the sleeve 13 a cylindrical seat is provided for an annular insert 39 to be pressed into the flange 18. The narrow annular disc insert 39, together with the bore 15 of pinion 11, provides for a trouble free seating of the components on the motor shaft.

Although the invention has been described in connection with an engagement coupling for an engine starter, for which it is particularly suitable, it is to be understood that it is applicable to overrunning couplings generally and that various modifications may be made within the inventive concept without departing from the spirit of the invention.

We claim:

1. A roller bearing overrunning coupling for engaging two coaxial rotatable members and adapted for use in the starter engagement mechanism of an internal combustion engine, having an inner cylindrical bearing surface provided on one rotatable member, a plurality of cylindrical bearing rollers in engagement therewith, and further comprising:

an outer race member (17), formed integrally with a flange (18) fixed on a sleeve (13) constituting the other of said rotatable members;

a plurality of radially inwardly directed stops carried by said outer race member and adapted to support cylindrical helical springs (25) acting respectively on said roller bearings seated in said outer race member, and guide means in the form of shaped bench masses formed on the surface of said flange facing said race and providing surfaces adapted to guide said springs, whereby separate guide members for said springs (25) are rendered unnecessary regardless of the circular cross-section of said springs (25).

2. A coupling as defined in claim 1 in which said outer race member (17), said flange (18), said sleeve

(13) and said guide means are formed as one unit by cold extrusion.

3. A roller bearing as defined in claim 2 in which the bore of the hub of said sleeve (13) is provided with a cylindrical seat molded into the flange (18) adapted to seat an annular positioning member (39).

4. A coupling as defined in claim 2 in which said guide means of said unit provided on the surface of said flange (18) facing said outer bearing race (17) are axially raised seating benches (28) for said springs (25) and in the circumferential direction they lead into the inwardly facing wall of said outer race (17) and in which the axial height of said seating benches is such that in case springs with round winding cross-section are utilized, the engagement of said springs (25) is at least approximately centered longitudinally on said roller bearings.

5. A coupling as defined in claim 4 in which the seating surface of each of said axially raised benches (28) of said unit is greater than the cross-sectional area of the adjacent stop (22).

6. A coupling as defined in claim 4 in which the inner boundary (33) of each said seating bench (28) farthest from the periphery of said outer bearing race member (17) has an arcuate course, of which the radius is such as to fit the radius of said inner cylindrical bearing surface, and in which said inner boundary (33) leads into the corresponding sidewall of the adjacent stop (22) without interruption.

7. A coupling as defined in claim 1 in which said outer bearing race (17) is provided with wedging surfaces for the rollers and with shoulders at the transition from said wedging surfaces to the retaining wall surfaces of the adjacent seating space for said springs (25) and in which the side edge (34) of each of said bench masses (28) which is farthest from the adjacent stop (22) leads into said shoulder (23) of said outer race (17) between said wedging surface (19) and the wall surface lying before it.

8. A coupling as defined in claim 1 in which the exposed face of each of said bench masses (28) situated on the side of said bench mass away from said flange (18) is provided with a centering surface (36) for engaging one of said helical springs (25).

9. A coupling as defined in claim 8 in which said exposed face of each of said bench masses (28) is rounded off to correspond to the winding cross-section of said helical spring.

10. An outer race unit for a roller bearing overrunning coupling adapted for use in the starter engagement mechanism of an internal combustion engine, comprising:

a race member (17) formed integrally with a flange (18) fixed on a sleeve (13);

a plurality of radially inwardly directed stops carried by said race member and adapted to support cylindrical helical springs (25) acting on the respective roller bearings which said race member is designed to seat, and guide means in the form of shaped bench masses formed on the surface of said flange facing the race formed by said race member and adapted to guide said springs, said bench masses (28) having exposed faces situated on the side of the bench mass away from said flange (18) provided with a centering surface (36) for engaging one of said helical springs (25), said centering surfaces (36) for said helical springs (25) being shorter in the circumferential direction than said bench masses (28).

11. An outer race unit for a roller bearing coupling as defined in claim 10 in which said centering surfaces (36) for said helical springs (25) terminate before reaching the transition from said bench mass (28) to said stop (22).

12. An outer race unit for a roller bearing coupling as defined in claim 10 in which said stops (22) are shorter in the axial direction that said outer bearing race (17) and that their free ends taper towards and end at the inner retaining surface of said outer race at some distance short of the axial extremity of said outer race.

13. A roller bearing overrunning coupling for engaging two coaxial rotatable members and adapted for use in the starter engagement mechanism of an internal combustion engine, having an inner cylindrical bearing surface provided on one rotatable member, a plurality of cylindrical bearing rollers in engagement therewith, and further comprising:

an outer race member (17) formed integrally with a flange (18) fixed on a sleeve (13) constituting the other of said rotatable members;

a plurality of radially inwardly directed stops carried by said outer race member and adapted to support cylindrical helical springs (25) acting respectively on said roller bearings seated in said outer race member;

guide means in the form of shaped bench masses formed on the surface of said flange facing said race and providing surfaces adapted to guide said springs, and a cover disc (30) is provided for the open side of said bearing between said outer race member and the member having said inner cylindrical bearing surface, said cover disc having projections (29) opposite said bench masses (28) of said flange (18) adapted to hold said springs (25) against said bench masses (28).

14. A coupling as defined in claim 13 in which said projections (29) of said cover disc (30) are shaped to correspond to the inner contour of said outer race (17) and are thereby adapted to fix said cover disc relative to said outer race.

15. A roller bearing as defined in claim 14 in which said projections (29) of said cover disc (30) are so shaped that said cover disc (30) may be seated equally well on a right hand turning or a left hand turning starter engagement device.

* * * * *